UNITED STATES PATENT OFFICE.

THOMAS THORNE BAKER, OF WESTMINSTER, LONDON, ENGLAND.

SALT FOR USE IN BATHS.

1,189,653.  Specification of Letters Patent.  Patented July 4, 1916.

No Drawing.  Application filed August 5, 1914. Serial No. 855,244.

*To all whom it may concern:*

Be it known that I, THOMAS THORNE BAKER, a subject of the King of Great Britain, residing at 39 Victoria street, in the city of Westminster and county of London, England, have invented certain new and useful Improvements in or Relating to Salts for Use in Baths, of which the following is a specification.

This invention relates to the preparation of a bath salt containing homogeneously distributed radio-active matter and its chief object is to produce economically a salt containing the radio-active matter in such a condition that when the salt is dissolved in the water the radio-active substance remains in suspension in finely divided particles, while the water is being used for bathing purposes.

I have discovered that it is possible to form a solution of the radium compound in salt without dissolving either of the materials in water, owing to the fact that the solid radium compound will dissolve in the salt when the latter is heated to a molten state.

According to my invention therefore a radio-active compound, such as radium-barium chlorid or very finely divided radio-active mineral matter, is introduced in the solid or dry state into molten sodium chlorid preferably containing a small percentage of a sulfate, such as calcium sulfate. The radio-active substance when introduced into the salt in a fused condition (usually at about 1300° F) dissolves therein and is thus homogeneously distributed, producing a bath salt which when dissolved in water gives, with the natural sulfates in the latter or the sulfate in the salt, fine insoluble particles of radio-active matter of therapeutic value, which particles are so finely divided that they remain in suspension throughout the water and render the bath radio-active. If, as appears to be the case, the radium compound is converted to a greater or less extent into a chlorid by the molten salt, the radium chlorid so formed will combine with the sulfates or carbonates always present in sufficient quantities in tap water to form insoluble radium sulfates and carbonates in a very fine state of division. The two typical reactions, both probably taking place on dissolving the salt, may be approximately represented by the following equations:—

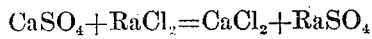

and

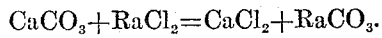

The radio-active substance is preferably added in such proportions as to give about 3 milligrams of radium to a ton of the sodium chlorid.

What I claim and desire to secure by Letters Patent of the United States is:—

1. The process for preparing a radio-active soluble salt consisting in introducing solid radio-active matter into sodium chlorid while the latter is in a molten condition.

2. The process for preparing a radio-active soluble salt consisting in fusing sodium chlorid and adding to the molten salt a quantity of radio-active substance which dissolves in the fused material.

3. The process for preparing a radio-active soluble bath salt which consists in fusing sodium chlorid containing a small proportion of a sulfate and in adding to the molten salt a quantity of radio-active substance which dissolves in the fused material.

4. The process for preparing a radio-active soluble salt which consists in heating sodium chlorid to a temperature of about 1300° F. and dissolving in the molten salt a quantity of radio-active substance.

5. The process for preparing a radio-active soluble salt which consists in fusing sodium chlorid and adding to the molten salt such a quantity of radio-active substance as will give about 3 milligrams of radium per ton of salt.

In testimony whereof I affix my signature in presence of two witnesses.

THOMAS THORNE BAKER.

Witnesses:
 A. M. GLASS,
 T. SELBY WARDLE.